2,841,567

ANTI-STATIC COMPOSITION, PROCESS OF MAKING AND PROCESS OF APPLYING

George K. Blanton, South Charleston, and Theophilus A. Feild, Jr., Charleston, W. Va., assignors to Union Carbide Corporation, a corporation of New York No Drawing. Application November 21, 1955
Serial No. 548,249

8 Claims. (Cl. 260—29.6)

This invention relates to a novel composition for the treatment of textiles and other articles made from or containing hydrophobic synthetic resins for the purpose of preventing or inhibiting the accumulation of surface charges of static electricity thereon during the production of such articles, the subsequent treatment thereof in connection with the usual finishing operations, and during the service life of the article. The invention includes a novel process for the preparation of such anti-static compositions in stable polymerized form permitting them to be shipped and stored for considerable periods of time without attendant gelation of the anti-static agent. The invention has especial utility for the production of static-resistant textile articles made from hydrophobic resins formed by the polymerization of acrylonitrile or vinyl chloride, alone or in conjunction with another polymerizable compound such as acrylonitrile, vinyl chloride, vinyl acetate, styrene, the vinyl benzenes, the alkyl acrylate esters and corresponding alpha-methacrylate esters, and the like.

Heretofore various anti-static treatments have been devised that have imparted to certain hydrophobic vinyl resin textile articles more or less temporary protection against the accumulation of surface charges of static electricity. In general, however, it may be said that the anti-static treatments available today for such articles lack permanence and usually must be renewed after each laundering or dry-cleaning of the article to insure continued protection.

One prior process which was capable of providing good anti-static protection for such articles for an extended period of time involved the coating or impregnating of the article with an aqueous solution of polymerizable mono- or di-ester of certain polyethylene glycols with acrylic acid, or preferably with mixtures of such mono- and di-esters, followed by a heat treatment of the article to remove the water in the presence of a water-soluble free radical generating polymerization catalyst. While the composition was highly effective when produced near or at the place of its use, difficulties arose when the composition had to be shipped or stored for considerable periods of time due to unpredictable changes in viscosity and even gelling in the shipping containers. As a result, activation in the field of the anti-static composition yielded variable and unsatisfactory results. In other cases, retained catalysts, if present, affected the color of fabrics which had been dyed with certain dyestuffs.

The present invention is based in important part upon the discovery that highly effective anti-static compositions providing substantially permanent anti-static protection for these articles made from hydrophobic resins can be prepared which contain the active polymeric anti-static agent in concentrated form and which are relatively stable during shipping and storage over long periods of time. Because the compositions are substantialy free from added polymerization catatlysts when used, their use does not cause discoloration of pre-dyed fabrics, and these novel compositions are readily applicable to the article to be treated therewith and dried thereon in simple manner.

An important feature of this invention resides in the discovery that an inorganic boron compound such as borax, boric acid and other boron compounds hereinafter named must be present in the aqueous solution of the polyethylene acrylate monomers prior to initiation of the steps of polymerizing and concentrating the solution since otherwise uncontrolled polymerization with attendant gel formation will often occur. The boron compound appears to function as a polymerization assistant effective to prevent gelling of the solution. Another important feature of the invention is the control of the character of the polymer formed as the result of the regulation of the total solids content of the dilute solution of monomer at the beginning of the polymerization and concentration step. Thus, when using peracetic acid as the catalyst, aqueous solutions of the polymer produced from an initial monomer concentration of 4 percent or less yields permanently water soluble products, while the use of initial monomer concentrations above 4 percent in the aqueous solution being polymerized and activated yields useful products which, after application to the article and drying thereof, become water insoluble. As the initial monomer concentration is increased the products become progressively more adhesive.

While sodium tetraborate decahydrate (borax) is a preferred boron compound useful in the process, there may be substituted therefor boric acid and other inorganic borates, such as the alkali metal and ammonium polyborates, i. e., ammonium biborate, ammonium pentaborate, potassium tetraborate and potassium pentaborate.

In the practice of the invention for the preparation of the novel anti-static composition, esters of acrylic acid with polyethylene glycols, and particularly those possessing a structure corresponding to the formula $$CH_2\!\!=\!\!CHCOO(CH_2CH_2O)_nR$$

wherein R can be hydrogen or the acrylyl group, and $n$ is an integer from 7 to 22, are mixed with water to form an aqueous solution thereof containing from about 4 percent to about 12 percent of the ester monomer. To this solution is added from about 1 percent to about 16 percent of an inorganic boron compound of the type hereinafter described, based upon the dry weight of the ester, and between 5 percent and 25 percent, based on the dry weight of the ester, of a vaporizable polymerization catalyst selected from the class consisting of peracetic acid, hydrogen peroxide, and mixtures thereof. This mixture, which commonly has a pH within the range between 2 and 7 is then polymerized and concentrated, i. e., activated, by removal of water, preferably at the boiling point at atmospheric pressure, although subsatmospheric pressure may be employed, if desired. Preferably the removal of water is continued until the concentrate has a total solids content of between around 15 percent and around 60 percent. Under these conditions the concentrated composition has a pH value commonly within the range between 2 and 7, and usually around 3 to 6. This composition is relatively stable and substantially free from the added polymerization catalyst since eventually the excess catalyst is removed overhead during the concentration step. It can be used at once in the manner hereinafter described, or it can be safely stored or shipped in the concentrated form.

The polyethylene glycol acrylates used in the process can be made in a well known manner by reacting the polyethylene glycol and acrylic acid, preferably in the molar ratio of 1:1.5, respectively, in solution in benzene and in the presence of an acid catalyst, such as sulfuric acid, and of a polymerization inhibitor, such as hydroquinone, copper, or other well known inhibitors.

In the treatment of articles containing or made from hydrophobic synthetic resins to reduce the tendency of the articles to accumulate surface charges of static electricity, the concentrated composition hereinbefore described is diluted with water to a total solids content usually in the range between about 0.25 percent and about 10.0 percent or more. The article then is immersed, dipped, sprayed, padded, or otherwise coated or impregnated with a dilute aqueous solution or emulsion of the polymerized polyethylene glycol esters, commonly at temperatures around room temperature or above. When treating a textile article by the present process, the excess of treating solution is pressed out until the article contains around 100%, more or less, of its weight of the solution. The treated article then is dried at room temperature or higher, the final drying usually being effected at temperatures between about 70° C. and about 120° C. or higher, for times ranging from one to twenty minutes or longer, the time in general varying inversely with the temperature, thereby imparting to the article a long lasting antistatic surface.

Under these conditions the polyethylene acrylate polymers with which the article is impregnated or coated are converted into a water-insoluble coating that bonds tenaciously to the article and effectively inhibits or retards the development of surface charges of static electricity on the article or drains off such charges.

The application of as little as 0.25 percent of the antistatic agents of this invention, based upon the dry fabric weight, provides a substantial degree of resistance to the generation of charges of static electricity for the aforesaid articles treated therewith, where long sustained or permanent protection is not essential, or where the treated article is not subjected later to repeated washing or scouring steps. However, for best results, in general, it is desirable to apply around 4 percent or more of the anti-static agent, based upon the dry fabric weight.

The following examples will serve to illustrate the invention. In the examples all parts are expressed in terms of part by weight unless otherwise indicated.

*Example 1*

To 1576 parts of water were added 400 parts of mixed acrylate esters of polyethylene glycols having an average molecular weight of about 600. To the resultant solution were added 4 grams of sodium tetraborate decahydrate (borax), (corresponding to 2.32 percent of the dry weight of the said acrylate esters). Thereafter were added 20 grams of commercial peracetic acid containing 40 percent of active peracetic acid and 5 percent of hydrogen peroxide, equivalent to a total of 5.3 percent of the dry weight of the polyglycol acrylate esters. The resultant mixture, which contained 8.8 percent of the acrylate esters and had a pH of 4.8, was heated at the boiling point until there remained 400 grams of a concentrated aqueous solution containing 43.44 percent of total solids, and having a pH of 5.6, an unsaturation (milliequivalents of bromine per gram) of 0.33, a color (Gardner units) of 13, and a viscosity at 20° C. of 265.38 cks.

A portion of this concentrate was adjusted to a pH of 7.0 with a 20 percent sodium hydroxide solution. The concentrate as produced, and the portion adjusted to a pH of 7, respectively, were diluted with water to a total solids content of 6 percent. Each of these solutions then was applied by padding to an 8 ounce gabardine fabric made from yarns spun from a vinyl chloride-acrylonitrile copolymer resin containing 60 percent vinyl chloride in the polymer and being marketed under the trade name "Dynel." The pad pressure was adjusted to permit a wet pick-up of 70 percent, corresponding to a solids pick-up of 4.2 percent, based on the dry weight of the fabric. Portions of each of the thus treated fabrics then were dried at 60° C. for 10 minutes and thereafter at 120° C. for 10 minutes. These treated fabrics then were tested to determine the durability of the static protection imparted to them, using testing procedures hereinafter described. The following results were secured:

INITIAL

| Sample | Volume Resistivity | Dirt Pickup | Static Generation, volts |
|---|---|---|---|
| 1 | $1.0 \times 10^6$ | None | None |
| 2 | $4.6 \times 10^5$ | None | None |

AFTER TEN WASHES

| Sample | Volume Resistivity | Dirt Pickup | Static Generation, volts |
|---|---|---|---|
| 1 | $1.2 \times 10^9$ | None | None |
| 2 | $5.2 \times 10^8$ | None | None |

AFTER FIFTEEN WASHES

| Sample | Volume Resistivity | Dirt Pickup | Static Generation, volts |
|---|---|---|---|
| 1 | $1.6 \times 10^9$ | None | −250 |
| 2 | $2.6 \times 10^8$ | None | None |

1—pH of 5.6.
2—pH adjusted to 7.

The mixture of polyethylene glycol acrylates used in this example were made by reacting 124 mols of peroxide free polyethylene glycol having an average molecular weight of 600, 185.8 mols of acrylic acid, 582 pounds of benzene and 3.8 pounds of concentrated sulfuric acid at a temperature of refluxing benzene until only 0.87% of free acrylic acid was present. The sulfuric acid then was neutralized with sodium acetate and the benzene was removed by stripping the same off under a vacuum at a kettle temperature of between 45 and 50° C., water being added to replace the benzene. The resultant aqueous solution of the acrylate esters was adjusted to a pH of 6.0–7.0 with sodium hydroxide, and filtered. Then 0.3 percent of 1,3,5-trinitrobenzene (based on the weight of acrylic acid initially charged), was added as a polymerization inhibitor. The resultant product had a total solids content of 42.8 percent, a pH of 5.7, and a viscosity of 10.23 cks. at 20° C.

*Example 2*

Following the procedures described in Example 1, using the materials described therein with the exception that during the concentration of the aqueous solution of acrylate esters the solution being concentrated was circulated three times through a continuous stripper heated by low pressure steam and operating under an absolute pressure of 100 mm. of mercury to remove water, the resultant concentrate had the following analysis: total solids, percent, 37.4; color (Gardner units) 9.0; pH 5.0; unsaturation (milliequivalents of bromine per gram), 0.44; viscosity at 20° C., (cks.) 168.3.

One half of the concentrate thus produced was adjusted to a pH of 7.0 with 20 percent of sodium hydroxide; and (1) the concentrate as produced and (2) the concentrate at pH 7, respectively, were diluted with water, applied to a "Dynel" fabric, dried and tested, all in the manner described in Example 1. The following results were secured:

INITAIL

| Sample | Volume Resistivity | Dirt Pickup | Static Generation, volts |
|---|---|---|---|
| 1 | $5.7 \times 10^7$ | None | None |
| 2 | $6.2 \times 10^7$ | None | None |

AFTER FIVE WASHES (MACHINE)

| Sample | Volume Resistivity | Dirt Pickup | Static Generation, volts |
|---|---|---|---|
| 1 | $1.4 \times 10^9$ | None | None |
| 2 | $8.7 \times 10^8$ | None | None |

1—pH of 5.
2—pH adjusted to 7.

Example 3

To 1576 grams of water were added 400 grams of a 42.8 percent aqueous solution of acrylate esters of polyethylene glycol 600, as described in Example 1. To this solution were added 4 grams of borax (equivalent to 2.3 percent based on the dry weight of the polyglycol acrylate present), together with 20 grams of a 30 percent aqueous solution of hydrogen peroxide, corresponding to 3.5 percent of hydrogen peroxide, based on the dry weight of the polyethylene glycol acrylate. The resultant mixture which contained 8.8 percent of the acrylate ester solids and had a pH of 5.3 was concentrated at the boiling point until the concentrate had a total solids content of 46 percent. It also had a pH of 5.2, a color (Gardner units) of 12, an unsaturation (milliequivalents of bromine per gram) of 0.32; and a viscosity at 20° C. of 191 cks.

One-half of this concentrate was adjusted to a pH of 7 with 20 percent sodium hydroxide. (1) The concentrate as produced, and (2) the concentrate with a pH of 7, respectively, were diluted with water, applied by padding to a fabric made from a copolymer of acrylonitrile and vinyl chloride containing 60 percent of vinyl chloride, and dried and tested, all in the manner described in Example 1. The following results were secured:

INITIAL

| Sample | Volume Resistivity | Dirt Pickup | Static Generation, volts |
|---|---|---|---|
| 1 | 1.3×10$^6$ | None | None |
| 2 | 8.7×10$^5$ | None | None |

AFTER FIFTEEN WASHES

| | | | |
|---|---|---|---|
| 1 | 1.0×10$^8$ | None | None |
| 2 | 2.0×10$^8$ | None | None |

Example 4

To 1566 grams of water were added 400 grams of a 42.8 percent aqueous solution of mixed acrylate esters of polyethylene glycols having average molecular weights of about 600. To the resultant solution were added 4 grams of borax, equivalent to 2.3 percent of the dry weight of the said acrylate esters. Thereafter were added sufficient aqueous sulfuric acid to adjust the pH to 3.0. Then 30 grams of 30 percent aqueous hydrogen peroxide, equivalent to 5.25 percent of the weight of the acrylate esters, dry basis, were added. The resultant mixture contained 8.8 percent of said mixed acrylate ester solids, and had a pH of 3.0. It was slowly concentrated at temperatures up to around 100° C. The resultant concentrate had the following analysis: total solids, percent=43.53; pH=2.75; unsaturation (milliequivalents per gram)=0.19; viscosity at 20° C., centistokes=270.06; color (Gardner units)=11.

One half of this concentrate was adjusted to pH 7 with 20 percent NaOH. The (1) concentrate as produced and the (2) concentrate adjusted to pH 7 were diluted with water to a total solids content of 6 percent, and these solutions were applied to "Dynel" fabric, dried and the treated fabrics tested, in the manner described in Example 1. The following results were secured:

INITIAL

| Sample | Volume Resistivity | Dirt Pickup | Static Generation, volts |
|---|---|---|---|
| 1 | 2.3×10$^7$ | None | None |
| 1A | 2.5×10$^7$ | None | None |
| 2 | 4.8×10$^6$ | None | None |
| 2A | 1.5×10$^6$ | None | None |

FIVE WASHES

| | | | |
|---|---|---|---|
| 1 | 7.2×10$^7$ | None | None |
| 1A | 3.4×10$^8$ | None | None |
| 2 | 7.8×10$^8$ | None | None |
| 2A | 5.8×10$^8$ | None | None |

FIFTEEN WASHES

| | | | |
|---|---|---|---|
| 1 | 4.0×10$^8$ | None | None |
| 1A | 6.6×10$^8$ | None | None |
| 2 | 6.4×10$^8$ | None | −100 |
| 2A | 8.3×10$^8$ | None | −200 |

1—pH 2.75—oven dried, 120° C.
1A—pH 2.75—air dried, 25° C.
2—pH adjusted to 7—oven dried, 120° C.
2A—pH adjusted to 7—air dried, 25° C.

The mixture of polyethylene glycol acrylates used in this example was made in the general manner described in Example 1.

Example 5

A quantity of the concentrated aqueous solution of polymers of polyethylene glycol acrylates produced in the manner described in Example 1, was diluted with water to an acrylate ester polymer solids content of 8 percent. The resultant solution was applied to a series of synthetic resin fibers hereinafter described by means of a standard padding technique, pressure on the pad rolls being adjusted to provide a 70 percent wet pickup, so that the acrylate ester polymer solids applied to the fabrics was 5.6 percent. The thus padded fabrics were dried for 10 minutes at 60° C., then further dried for 10 minutes at 120° C., washed three times by hand in water containing 2 percent of soap flakes and 0.5 percent of a sodium phosphate marketed under the trade name "Calgon," dried, and evaluated for static protection, with the following results:

AFTER THREE HAND WASHES AND FIVE MACHINE WASHES

| Sample | Volume Resistivity | Dirt Pickup | Static Generation, volts |
|---|---|---|---|
| A[1] | 7.6×10$^8$ | None | None |
| B[2] | 2.0×10$^9$ | None | None |
| C[3] | 6.9×10$^8$ | None | None |

AFTER ONE MACHINE WASH

| | | | |
|---|---|---|---|
| Nylon | 1.6×10$^9$ | None | −200 |

[1] Sample A is a fabric made from a resinous copolymer of vinyl chloride and acrylonitrile containing 40 percent of acrylonitrile.
[2] Sample B is a fabric made from a resinous copolymer of acrylonitrile and vinyl acetate, being marketed under the trade name "Acrilan."
[3] Sample C is a fabric made from a copolymer of acrylonitrile and another polymerizable monomer, and containing at least 85 percent of acrylonitrile, being marketed under the trade name "Orlon."

Example 6

A quantity of a concentrated aqueous solution of a polyglycol acrylate polyester, prepared in the manner described in Example 2, was stored in a clear glass bottle and exposed to sunlight at ambient temperature conditions for 3 months. A portion thereof was then diluted with water and applied by padding to a fabric in the manner described in Example 1, thus depositing on the fabric 4.5 percent of total solids of the solution. The treated article then was dried 10 minutes at 60° C., then dried 10 minutes at 120° C. and tested for anti-static protection in the general manner herein described. The following results were secured:

AFTER FIFTEEN MACHINE WASHES

| Volume Resistivity | Dirt Pickup | Static Generation, volts |
|---|---|---|
| 9.7×10$^8$ | None | None |

Example 7

The experiment described in Example 1 was repeated, with the exception that 2.3 percent of ammonium tetraborate $(NH_4)_2B_4O_7 \cdot 4H_2O$, based on the dry weight of the polyglycol acrylate solids, were used in place of borax. The aqueous solution, which initially contained 8.8 percent of the polyglycol acrylate solids and had a pH of 5.5, was polymerized and concentrated in the manner described in Example 1, to yield a concentrate having 41.2 percent of the said solids, and a pH of 4.5. This polymer concentrate was diluted with water to a total solids content of 6.0 percent and was applied to a "Dynel" woven fabric and the treated fabric was dried and tested in the manner described in Example 1, with the following results:

AFTER 5 MACHINE WASHES

| Volume Resistivity | Dirt Pickup | Static Generation, volts |
|---|---|---|
| $3.5 \times 10^9$ | None | None |

Example 8

Example 7 was repeated using 2.3 percent of potassium pentaborate, $K_2B_{10}O_{16} \cdot 8H_2O$, based on the dry weight of the polyglycol acrylate solids, in place of borax. The fabric, treated with a portion of the polymerized concentrate after dilution with water to a total solids content of 6 percent was dried and tested in the manner described in Example 1, yielding the following results:

AFTER 5 MACHINE WASHES

| Volume Resistivity | Dirt Pickup | Static Generation, volts |
|---|---|---|
| $2.3 \times 10^9$ | None | None |

Example 9

Following the procedure and conditions set forth in Example 1, but using 2.3 percent of boric acid in place of borax, the "Dynel" fabric treated in the manner described in that Example had good antistatic properties after scouring, as indicated below:

AFTER 5 MACHINE WASHES

| Volume Resistivity | Dirt Pickup | Static Generation, volts |
|---|---|---|
| $7.3 \times 10^8$ | None | None |

Example 10

To a mixture of 63 grams of a 32 percent aqueous solution of polyethylene glycol acrylates hereinafter described and 431 grams of water, there was added 0.75 gram of borax (equivalent to 3.7 percent of the dry weight of the polyglycol acrylates present), followed by 5 grams of a mixture containing 40 percent of peracetic acid and 5 percent of hydrogen peroxide in acetic acid and 1 percent of sulfuric acid, the total weight of peracetic acid and hydrogen peroxide being equivalent to 11.1 percent of the dry weight of the polyglycol acrylate present. The resultant solution contained 4 percent of the polyglycol acrylate solids, and had a pH of 4.5. This solution was polymerized and concentrated by boiling to form a concentrate having a total solids content of 35.4 percent, a pH of 4.1, and a viscosity at 20° C., of 316 cks. A portion of this concentrate was diluted with water to form a solution containing 6 percent of total solids, and was applied to a woven fabric described in Example 1 by padding, and the padded fabric thereafter was dried and tested in the manner described in that example. The treated fabric exhibited good anti-static properties after a washing in an automatic washing machine, exhibiting a volume resistivity of $4.8 \times 10^9$.

The polyglycol acrylate used in this example was made by reacting acrylic acid and a polyethylene glycol having an average molecular weight of about 400, in the molar ratio of 1.5 to 1, in the presence of benzene, a catalytic amount of sulfuric acid, and a small amount of a polymerization inhibitor. The mixture was reacted at refluxing temperature until over 99 percent of acrylic acid had reacted. The reaction mixture then was filtered, and the filtrate neutralized with sodium acetate and filtered, and thereafter benzene was removed from the mixture by distillation, water being added to replace the benzene thus removed. The resultant benzene-free liquid contained 32 percent of total solids.

Example 11

To a mixture of 165 grams of a 30 percent aqueous solution of a polyethylene glycol acrylate hereinafter described and 248 grams of water were added 1.7 grams of borax, equivalent to 3.4 percent of the dry weight of the said polyglycol acrylate present. Thereafter 2 grams of peracetic acid and 0.25 gram of hydrogen peroxide in solution in 2.75 grams of acetic acid and 0.05 gram of sulfuric acid were added, the total of peracetic acid and hydrogen peroxide being equivalent to 4.5 percent of the dry weight of the polyglycol acrylate present. The resultant solution contained 12 percent of the polyglycol acrylate solids, and had a pH of 4.8. This solution was polymerized and concentrated to a solution weight of 124 grams, the resultant concentrate having a total solids content of 42.4 percent, a pH of 4.35, and a viscosity at 20° C. of 578 cks.

A portion of this concentrate was diluted with water to form a solution containing 6 percent of total solids. It was then applied to "Dynel" woven fabric by padding and the padded fabric dried, all in the manner described in Example 1. Thereafter it was tested for durability of the static protection provided. The treated fabric had the following properties after being washed in an automatic washer in the manner herein described. Volume resistivity=$9.3 \times 10^8$; static generation=none; dirt pickup, none.

The polyglycol acrylate mixture used in this Example was made by reacting 27 grams of acrylic acid and 250 grams of a polyoxyethylene glycol having an average molecular weight of about 1,000, in admixture with 500 grams of benzene, 3.75 grams of sulfuric acid, and 0.27 gram of 1,3,5-trinitrobenzene, the mixture being refluxed with dropwise addition of the sulfuric catalyst until 99.27 percent of the acrylic acid had reacted. The reaction mixture then was filtered, the filtrate neutralized with sodium acetate and filtered, and the latter filtrate was fractionally distilled under vacuum to eliminate benzene, water being added to replace the benzene until the resultant aqueous solution contained 30 percent of the polyglycol acrylate monomer solids.

Example 12

To 778 grams of water were added 200 grams of the 42.8 percent aqueous solution of mixed acrylate esters of polyethylene glycols described in Example 1. To the resultant solution were added 2 grams of borax, equivalent to 2.3 percent of the dry weight of said acrylate esters. Thereafter there were added 20 grams of a 25 percent acetone solution of peracetic acid containing one gram of acetic acid, the weight of peracetic acid being equivalent to 5.8 percent of the dry weight of said acrylate esters. The resultant mixture, which contained 8.6 percent of the acrylate esters and had a pH of 4.5, was heated to around 100° C. in a vessel permitting removal of water vapors and the heating was continued until the residual concentrated aqueous solution of polymers contained 30.3 percent of total solids, and had a pH of 4.45, and a viscosity of 20° C. of 129 centistokes.

This polymer concentrate was diluted with water to form a solution having a total solids content of 4 percent, and was applied by padding in the manner described in Example 1 to a fabric made of yarn formed from a resinous copolymer of acrylonitrile and vinyl chloride containing around 40 percent of acrylonitrile. Pad pressure was adjusted to permit a wet pickup corresponding to a total solids pickup of 2.8 percent, based on the dry weight of the fabric. The padded fabric was dried and then tested for durability of static protection, both in the manner described in Example 1. The following results were secured:

| Sample | Volume Resistivity | Dirt Pickup | Static Generation, volts |
|---|---|---|---|
| Initial treated fabric | $9.5 \times 10^8$ | None | None |
| after 5 washes | $8.7 \times 10^8$ | None | None |
| after 10 washes | $1.8 \times 10^9$ | None | None |
| after 15 washes | $4.6 \times 10^9$ | None | None |

In evaluating the degree of permanence of the anti-static protection provided by the invention, a sample of the treated textile article is washed in an automatic washing machine of well known make, using a commercially available detergent. Each washing cycle involves (1) a six-minute wash at 140°–150° F. using one-half cup of the detergent to a 9 pound load; (2) one minute spin dry; (3) 2 minute rinse at 120° F.; (4) two minute spin dry; (5) two minutes rinse at 120° F.; (6) four minute spin dry. All samples are dried for 30 minutes at 175° F. after each wash. The durability of the anti-static protection is determined by repeated washing and drying as described above.

The test procedures which follow are conducted at 70° F. and 50 percent RH.

In the electrical resistivity measurement, the electrical resistance in ohms of 8 strands of the textile yarn being examined is measured by being secured between two terminal clamps spaced approximately 2 inches apart of an Ultrohmeter manufactured by Beckman Instrument Company, Pasadena, Calif. The resultant value for resistance is converted to volume resistivity (ohm cms.) employing the following formula:

Volume resistivity =
$$\frac{\text{Resistance} \times \text{wt. of fiber between clamps}}{\text{Density of the fiber} \times (\text{distance between clamps})^2}$$

Volume resistivity values of $5 \times 10^9$ ohm cms. or less are desirable for the best static protection.

In the static generation test, the article to be tested is rubbed 10 times with a woolen cloth, and the thus-charged sample is placed in a metal cup insulated to prevent loss of voltage from the cup, and having electrically connected therewith a suitable voltmeter. Measurements of 300 volts or more indicate some objectionable loss of anti-static protection by the article being examined.

Often a dirt pickup test is used for a quick and dependable indication of the effective protection provided against the generation of static charges of electricity for an article. In this test the specimen is rubbed ten times over the surface of a woolen cover cloth, after which the rubbed specimen immediately is moved into position over an open container containing synthetic soil and held there for 10 seconds at a distance of 1.0 inch above the soil. The synthetic soil consists of a mixture of 20 percent of coal ash, 40 percent of pigment grade carbon black, and 40 percent of bone charcoal, all by weight, and each ground to pass a 200-mesh screen prior to mixing. The rating of static protection is made visually by estimating the amount of dirt attracted to the surface of the specimen. A rating scale follows:

None—excellent protection
Slight—good protection
Medium—fair protection
Heavy—little or no protection By the practice of this invention it is now possible for the first time to provide an effective material capable of providing excellent resistance to the generation of static charges of electricity on textile materials and other articles made from hydrophobic resins of the type herein described. The anti-static compositions of the invention are producible in highly concentrated form and yet are sufficiently stable to normal atmospheric conditions to be readily transported and stored for considerable periods of time without injury or loss of their anti-static-imparting properties. These concentrated anti-static compositions have the outstanding advantage that they can be readily diluted with water and applied in the form of dilute aqueous solutions or dissolved in a water miscible organic solvent such as acetone and applied as a solvent system.

Although the thus-treated fabric needs to be thoroughly dried, no extended high temperature cure is necessary for proper fixation of the anti-static agent to the article. The concentrated polymer compositions before dilution generally have pHs within the range from 2 to 7, and preferably between 5 and 6. They are miscible in all proportions with water, and with water-soluble alcohols and ketones. Although insoluble in petroleum fractions and chlorinated hydrocarbons, the anti-static compositions can be applied in the form of emulsions containing such diluents.

The invention is susceptible of modification within the scope of the appended claims.

We claim:

1. An antistatic composition stable during storage, which comprises an aqueous solution essentially comprising from 15% to 60% by weight of polymers of acrylate esters of polyethylene glycols having average molecular weights between about 400 and about 1,000, and about 1% to about 16%, based upon the dry weight of said polymers, of an oxygen-containing inorganic compound of boron, said aqueous solution having been concentrated and the acrylate ester polymers therein formed by heating a 4% to 12% aqueous solution of said esters at temperatures up to around 100° C. in the presence of from about 5% to about 25%, based upon the dry weight of said ester, of a catalyst of the class consisting of hydrogen peroxide, peracetic acid and mixtures thereof.

2. An antistatic composition as defined in claim 1, wherein the said oxygen-containing inorganic compound of boron is a member of the class consisting of boric acid and the ammonium and alkali metal polyborates.

3. An anti-static composition as defined in claim 1 wherein the said boron-containing compound is borax.

4. Process for making an anti-static composition capable of imparting anti-static properties for prolonged periods of time to articles containing hydrophobic resins, which comprises polymerizing and concentrating to from about 15 percent to 60 percent of its initial weight a dilute aqueous solution having a pH in the range from 2 to 7 and essentially comprising initially from about 4 percent to about 12 percent of an acrylate ester of a polyethylene glycol having an average molecular weight within the range from about 400 to about 1000, from about 1 percent to about 16 percent of an oxygen-containing inorganic compound of boron, and from about 5 percent to about 25 percent of a catalyst of the class consisting of hydrogen peroxide, peracetic acid, and mixtures thereof, all percentages being based upon the dry weight of the said acrylate ester.

5. Process as defined in claim 4 wherein the said boron compound is borax.

6. Process for reducing the tendency of articles comprising hydrophobic synthetic resins to accumulate surface charges of static electricity, which comprises applying to the surface of such an article an activated aqueous solution essentially comprising polymers of acrylate esters of polyethylene glycols having average molecular weights within the range of about 400 to about 1,000, said aqueous solution also containing from about 1% to about 16%, based upon the dry weight of said acrylate esters, of an inorganic oxygen-containing compound of boron, and drying the thus treated article at temperatures of at least 25° C., the activation of said aqueous solution being effected by heating and concentrating an aqueous solution of the monomeric acrylate esters of the said polyethylene glycols initially containing from about 4% to about 12% of said esters and from about 1% to about 16%, based upon the dry weight of said acrylate esters, of the said compound of boron, in the presence of a catalyst of the class consisting of hydrogen peroxide, peracetic acid, and mixtures thereof, until the concentrate contains between about 15% and about 60% by weight of polymers of said acrylate esters and has a pH within the range of 2 to 7.

7. Process as defined in claim 6, wherein said acrylate ester polymers are polymers of a polyethylene glycol ester having a structure designated by the formula $$CH_2=CHCOO(CH_2CH_2O)_nR$$

wherein R is selected from the class consisting of hydrogen and the acrylyl group, and $n$ is an integer in the range from about 7 to about 22.

8. Process as defined in claim 6 wherein the said compound of boron is borax.

References Cited in the file of this patent
UNITED STATES PATENTS 2,375,140     Semon _____ May 1, 1945
2,628,178     Burnett et al. _____ Feb. 10, 1953